Oct. 18, 1932.    W. D. BURTON    1,883,537
TRANSMISSION MECHANISM
Filed May 2, 1929    2 Sheets-Sheet 1
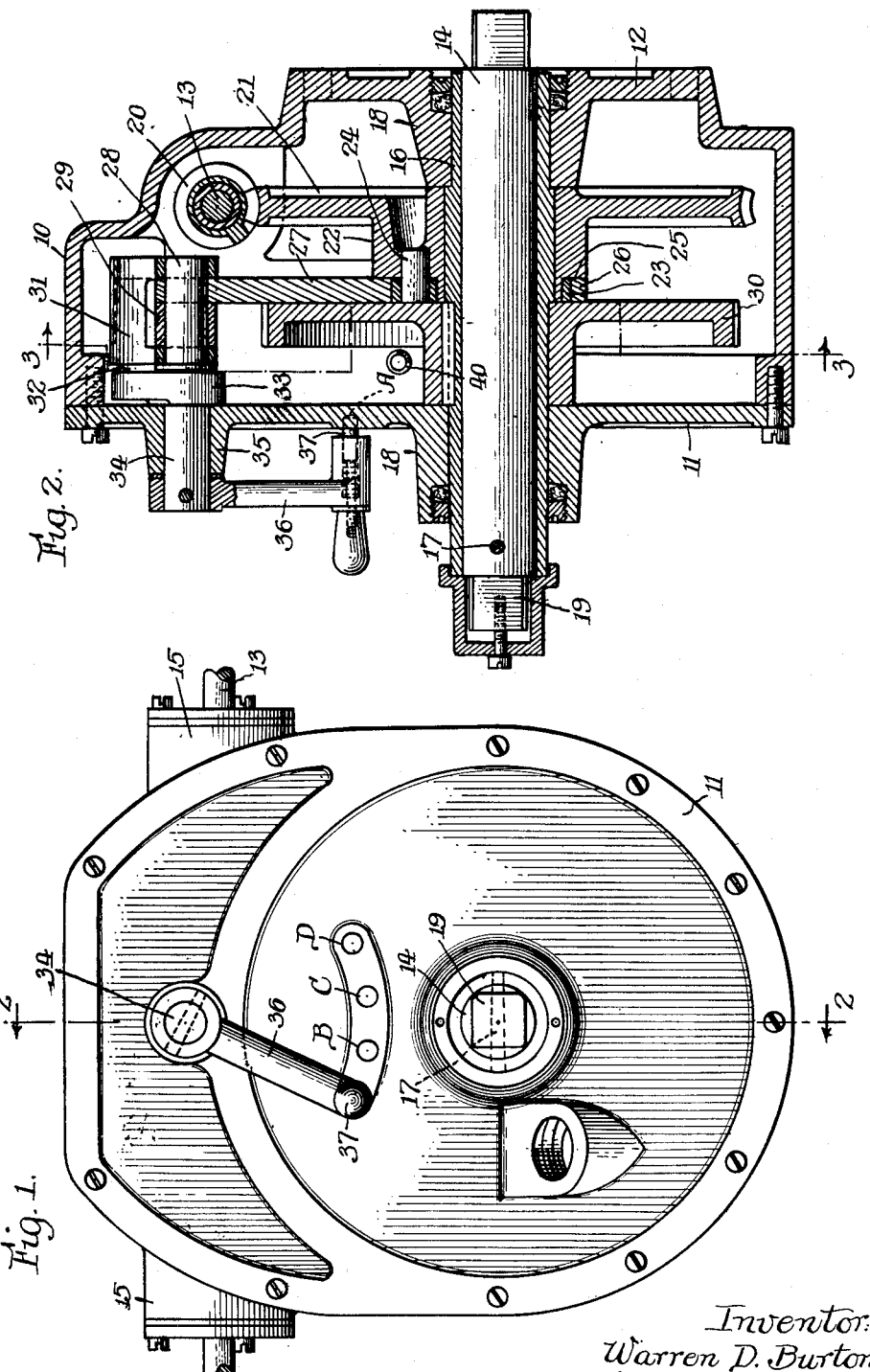

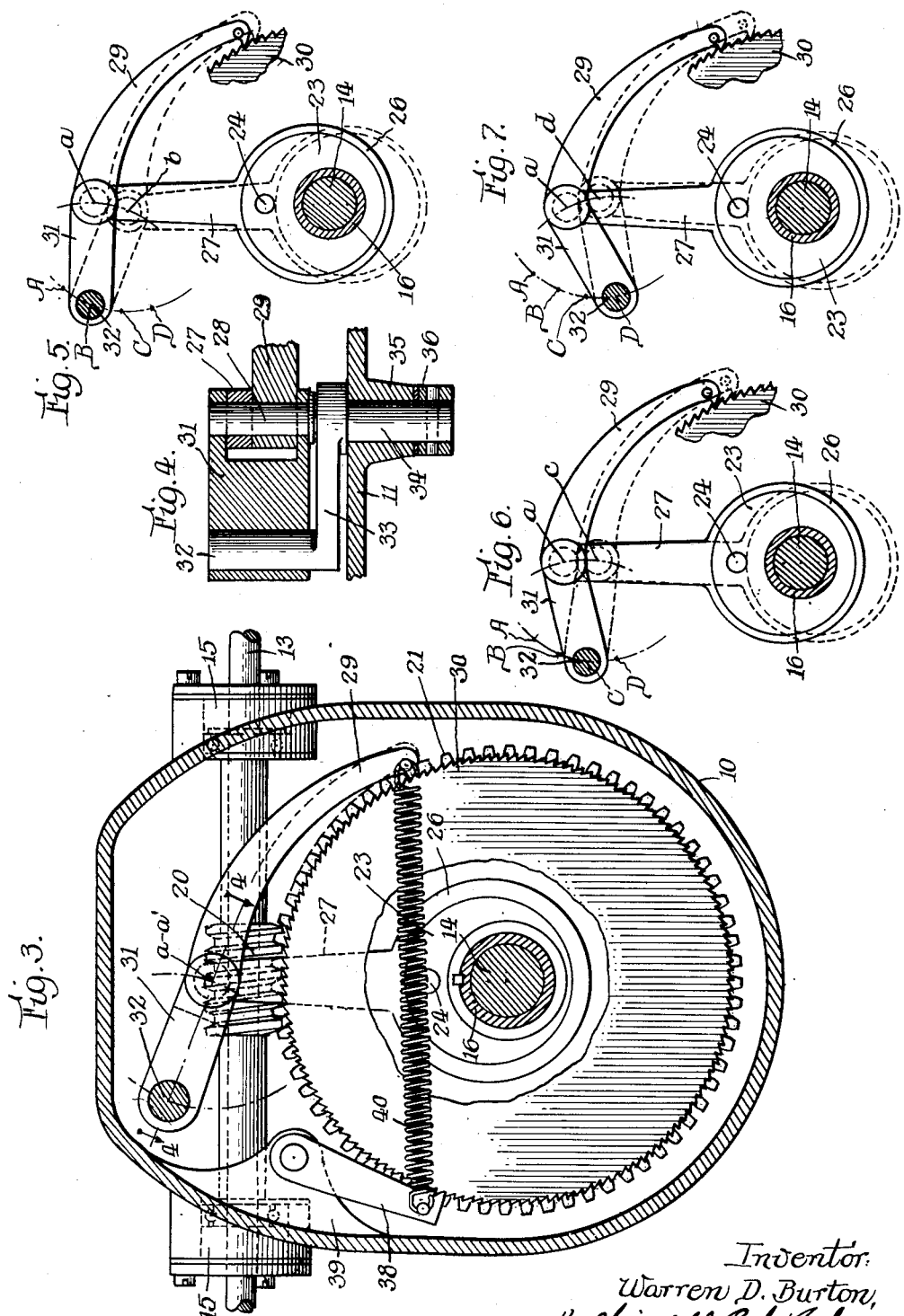

Patented Oct. 18, 1932

1,883,537

UNITED STATES PATENT OFFICE

WARREN DEAN BURTON, OF OAK PARK, ILLINOIS, ASSIGNOR TO COMBUSTIONEER INC., OF CICERO, ILLINOIS, A CORPORATION OF ILLINOIS

TRANSMISSION MECHANISM

Application filed May 2, 1929. Serial No. 359,728.

The present invention relates to improvements in transmission mechanisms of the variable speed type adapted to be interposed between a source of power and a driven member, such as the moving element of a coal stoker.

One of the objects of the invention resides in the provision of a new and improved transmission mechanism comprising a pawl and ratchet in which the movement of the pawl is selectively adustable from substantially zero progressively to maximum to impart a corresponding movement varying from zero progressively to maximum to the ratchet in one direction.

Another object of the invention resides in the provision of a pawl and ratchet mechanism of the foregoing character in which the pawl on its operative or feeding stroke is always returned to the same position, and which comprises a holding pawl for preventing reverse rotation of the ratchet wheel and mounted to engage a ratchet tooth substantially at the same time that the main pawl reaches the end of the feeding stroke, thereby substantially eliminating back-lash.

A general object of the invention is to provide a pawl and ratchet transmission mechanism which is simple in construction and efficient and accurate in operation, and which comprises a relatively small number of parts.

Further objects and advantages will become apparent as the description proceeds.

In the accompanying drawings, Fig. 1 is a front elevational view of a transmission mechanism embodying the features of my invention.

Fig. 2 is a transverse sectional view taken substantially along line 2—2 of Fig. 1.

Fig. 3 is a sectional view taken substantially along line 3—3 of Fig. 2.

Fig. 4 is a detail section view taken substantially along line 4—4 of Fig. 3.

Figs. 5, 6, and 7 are diagrammatic views illustrating the relative movements of the parts in three different positions of adjustment.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawings, the mechanism comprises a suitable casing 10. Preferably, this casing is an integral closed casting having a removable front cover plate 11 and having a rear mounting plate 12 adapted to be secured to a suitable support (not shown). Extending into the casing 10 is a driving member 13 and a driven member 14. These two members are operatively connected in the casing by a transmission which is adjustable to obtain any one of a plurality of speed ratios between the members from zero to maximum movement for the driven member. While the mechanism is adapted for a wide variety of adaptations, it is particularly adapted for use with coal stokers, and to this end, the driving member 13 may be operatively connected to a source of power (not shown), and the driven member 14 may be operatively connected to the desired movable part of the stoker, for example, the stoker feed screw (not shown).

In the present instance, the member 13 consists of a shaft which extends laterally through the top of the casing 10 and which is suitably journaled in bearings 15. The driven member 14 consists of a shaft extending through the casing 10 from front to rear, and secured in a sleeve 16 for rotation therewith by means of a suitable key, such as a taper shear pin 17. The sleeve 16 also extends through the casing 10 from front to rear, and is suitably journaled in bearings 18 formed in the cover plate 11 and the mounting plate 12. The rear end of the shaft 14 is adapted to be connected to the movable part of the stoker, and the front end is squared as indicated at 19 for the reception of a tool whereby it may be manually adjusted.

Rigidly secured to the shaft 13 is a worm 20 which meshes with a worm wheel 21 freely rotatable on the sleeve 16 and bearing against the inner end of the rear bearing 18. The worm wheel 21 is formed with a forwardly extending hub 22 on which a suitable eccentric 23 is mounted. The eccentric 23 is rigidly secured to the hub 22, as by means of a pin 24, for rotation therewith. Peripherally embracing the eccentric 23 and disposed against a shoulder 25 near the end of the hub 22 is an eccentric strap or ring 26 which is formed integrally with an upwardly extending arm 27. It will be evident that upon rotation of the worm gear 21, a reciprocatory movement will be imparted to the arm 27 by the eccentric 23.

The free upper end of the arm 27 carries a connecting pin 28 on which the upper end of a ratchet pawl 29 is pivotally mounted. The lower end of the ratchet pawl 29 is arranged to engage a suitable ratchet 30 suitably keyed to the sleeve 16 between the front cover plate 11 and the eccentric strap 26. The ratchet teeth are so disposed that the pawl 29 will impart a counter-clockwise movement as viewed in Fig. 3 to the ratchet 30 on its upward stroke.

Means is provided for guiding the movement of the connecting pin 28 so as to direct a component of the thrust of the arm 29 along the ratchet pawl 29. This means preferably comprises a link 31, one end of which is bifurcated, the bifurcations being secured to opposite ends of the pin 28 at opposite sides of the arm 27 and the pawl 29. The other end of the link 31 is pivotally secured to a crank pin 32 which is adapted to be held in different fixed positions of adjustment. The pin 32 is secured to a crank arm 33 rigidly secured to a shaft 34 adjustably mounted in a bearing 35 formed in the front cover plate 11. The forward end of the shaft 34 extends beyond the front end of the bearing 35, and is provided with an adjusting arm or lever 36 depending therefrom.

Obviously, the arm 36 may be adjusted to vary the position of the crank pin 32, and thereby to adjust the component of thrust of the arm 27 along the pawl 29. Any suitable number of positions of adjustment may be provided, and in the present instance four such positions A, B, C, and D are shown.

Any suitable means may be provided for securing the arm 36 selectively in its different positions of adjustment. To this end, the free end of the arm 36 is provided with a spring pressed detent 37 which is adapted to engage selectively in a plurality of recesses formed on the front face of the cover plate 11, and defining the different positions of adjustment A, B, C and D.

In Figs. 1 to 4, the parts of the transmission mechanism are shown in position A. In this position, the resultant movement of the pin 28 is along the line a—a'. It will be noted that this line if substantially at right angles to the pawl 29 so that only a slight longitudinal movement ineffectual to rotate the ratchet 30 is imparted to the pawl 29. The movement of the arm 27 is spent in oscillating the pawl 29 substantially about its point of engagement with the ratchet 30.

In Fig. 5, the parts are shown in the B position of adjustment. In this instance, the resultant movement of the pin 28 is along the line a—b, and has a small component along the pawl 29 sufficient to reciprocate the latter through approximately the distance of one ratchet tooth, as indicated in dotted outline. In operation, this adjustment therefore will effect a slow feed.

In Fig. 6, the parts are shown in the C position of adjustment. In this instance, the resultant movement of the pin is substantially along the line a—c, and a substantially greater movement is given to the pawl 29 to rotate the ratchet 30 at a somewhat greater speed.

In Fig. 7, the parts are shown in the D position of adjustment. In this instance, the resultant movement of the pin 28 is substantially along the line a—d, and the component thereof along the pawl 29 is sufficient to index the ratchet 30 through the distance of three teeth. It will be obvious that any suitable range of adjustment may be provided, and that the range of each individual adjustment may be varied as desired without departing from the spirit and scope of the invention.

Suitable means is provided for preventing back-lash. Preferably, this means comprises a holding pawl 38 pivotally mounted at its upper end in a lug 39 projecting inwardly from the side wall of the casing 10 opposite the main pawl 29. The lower end of the holding pawl 38 is arranged to engage the ratchet teeth to hold the ratchet against rotation in a clockwise direction as viewed in Fig. 3. It will be noted that the main pawl 29 at the end of its feeding stroke is always returned to the same point, i. e. to the point a. The holding pawl is so positioned that it will engage and interlock with one of the ratchet teeth at the end of each feeding stroke of the pawl 29 regardless of the adjustment of the stroke, thereby preventing back-lash at all times.

Any suitable means may be provided for holding the pawls 29 and 38 yieldably in engagement with the ratchet 30, and in the present instance this means comprises a tension coil spring 40 anchored at its opposite ends to the free ends of the pawls.

It will be evident that I have provided a highly advantageous transmission mechanism which is simple in construction, which is efficient and accurate in operation, which can be easily and quickly adjusted to vary the speed of the driven member over a range substantially from zero to maximum, and which comprises a relatively small number of parts. The construction is sturdy, and not subject to objectionable wear. Its operation is smooth and noiseless.

I claim as my invention:

1. A transmission mechanism comprising, in combination, a casing, a sleeve mounted for rotation in said casing, a driven member extending into said sleeve and keyed thereto, a driving member extending into said casing, a gear rotatable on said sleeve and operatively connected to said driving member, an eccentric disc secured to said gear for rotation therewith, a ratchet keyed to said sleeve, an eccentric strap freely rotatable on said eccentric disc and having an arm extending therefrom to beyond the outer periphery of said ratchet, a pawl pivotally secured to the outer end of said arm and engaging said ratchet, a crank pin adjustably mounted in said casing, and a link pivotally secured to said pin and to the outer end of said arm, said link being adapted to cause said arm to describe an arcuate movement about said pin, said pin being adjustable toward and from the line of reciprocation of said pawl so as to vary the component of said arcuate movement along said pawl.

2. A transmission mechanism comprising, in combination, a casing, a sleeve mounted for rotation in said casing, a driven member extending through said sleeve and keyed thereto, a driving member extending into said casing, a gear rotatable on said sleeve and operatively connected to said driving member, a ratchet keyed to said sleeve, eccentric means operatively connected to said gear and having an arm extending to beyond the outer periphery of said ratchet, a pawl pivotally secured to the outer end of said arm and engaging said ratchet, a pin mounted in said casing, a link pivotally secured to said pin and to the outer end of said arm, said link being adapted to cause said arm to describe an arcuate movement about said pin, said pin being laterally adjustable toward and from the line of reciprocation of said pawl so as to vary the component of said arcuate movement along said pawl.

3. A transmission mechanism comprising, in combination, a casing, a driven member extending into said casing, a driving member extending into said casing, a gear rotatable on said driven member and having operative connection with said driving member, an eccentric secured to said gear for rotation therewith, a ratchet keyed to said driven member, an eccentric strap freely rotatable on said eccentric and having an arm extending therefrom, a pawl pivotally secured to the outer end of said arm and engaging said ratchet, a pin adjustably mounted in said casing, and a link pivotally secured to said pin and to the outer end of said arm, said link being adapted to describe an arcuate movement about said pin, said pin being adjustable toward and from the line of reciprocation of said pawl so as to vary the component of said arcuate movement along said pawl.

4. A transmission mechanism comprising, in combination, a driving member, a driven member, an eccentric operatively connected to said driving member, an eccentric strap freely rotatable on said eccentric and having a reciprocatory arm extending therefrom, a clutch element operatively connected to said driven member, a clutch operating member pivotally connected to the outer end of said arm, a pin, and a link pivotally secured to said pin and to the outer end of said arm, said link being adapted to cause said arm to describe an arcuate movement about said pin, said pin being adjustable laterally toward and away from the line of reciprocation of said clutch operating member to change the direction of arcuate movement of said arm about said pin so as to vary the component of said arcuate movement along said pawl.

5. A transmission mechanism comprising, in combination, a driving member, a driven member, an eccentric operatively connected to said driving member, an eccentric strap freely rotatable on said eccentric and having a reciprocatory arm extending therefrom, a clutch element operatively connected to said driven member, a clutch operating member pivotally connected to the outer end of said arm, a link pivoted near one end to the outer end of said arm and extending away from said clutch operating member in a direction which is substantially on the general line thereof, and means for adjustably fixing the other end of said link about its pivotal connection with said arm to vary the component of movement of said clutch operating member.

6. A transmission mechanism comprising, in combination, a driving element, a driven element, eccentric means operatively connected to said driving element and having a reciprocatory arm pivotal about one end, a ratchet operatively connected to said driven element, a ratchet pawl in engagement with said ratchet, a link arranged substantially as a continuation of said pawl, a pivot connecting said arm and pawl and link together, and means for adjustably swinging said link about said pivot from a substantially straight line relationship with said pawl to an angular relationship to vary the extent of reciprocatory movement imparted to said pawl by said arm.

7. A transmission mechanism comprising, in combination, a driving element, a driven element, eccentric means operatively connected to said driving element and having a reciprocatory arm pivotal about one end, a ratchet operatively connected to said driven element, a ratchet pawl in engagement with said ratchet, an adjusting link arranged substantially as a continuation of said pawl, a pivot connecting said arm and pawl and link together, and means for determining a plurality of positions of adjustment of said link about its pivot to vary the extent of reciprocatory movement of said pawl, each of said positions being arranged to effect a movement of said pawl which in reciprocatory extent is substantially a multiple of the distance between adjacent ratchet teeth.

In testimony whereof, I have hereunto affixed my signature.

WARREN DEAN BURTON.